US009126422B2

(12) United States Patent
Collins et al.

(10) Patent No.: US 9,126,422 B2
(45) Date of Patent: Sep. 8, 2015

(54) MECHANISM FOR LABELING LABORATORY PRINT MEDIA

(75) Inventors: Mark Andrew Collins, Dripping Springs, TX (US); Charles W. Morrison, Jarrell, TX (US)

(73) Assignee: VAPORPRINT, LLC, Morrison, CO (US)

( * ) Notice: Subject to any disclaimer, the term of this patent is extended or adjusted under 35 U.S.C. 154(b) by 390 days.

(21) Appl. No.: 13/092,687

(22) Filed: Apr. 22, 2011

(65) Prior Publication Data

US 2012/0269564 A1 Oct. 25, 2012

(51) Int. Cl.
*H04N 1/00* (2006.01)
*B41J 3/407* (2006.01)

(52) U.S. Cl.
CPC .................................... *B41J 3/407* (2013.01)

(58) Field of Classification Search
USPC ........................................ 358/1.15; 400/76
See application file for complete search history.

(56) References Cited

U.S. PATENT DOCUMENTS

| | | | | |
|---|---|---|---|---|
| 5,662,821 | A | 9/1997 | Ruckl | |
| 6,452,692 | B1 | 9/2002 | Yacoub | |
| 2003/0120633 | A1 * | 6/2003 | Torre-Bueno | 707/1 |
| 2004/0098165 | A1 | 5/2004 | Butikofer | |
| 2004/0184058 | A1 | 9/2004 | Miyajima | |
| 2007/0098900 | A1 | 5/2007 | Abe | |
| 2007/0141711 | A1 * | 6/2007 | Stephens et al. | 436/43 |
| 2008/0056951 | A1 | 3/2008 | Angros | |
| 2008/0235055 | A1 * | 9/2008 | Mattingly et al. | 705/3 |
| 2009/0003151 | A1 | 1/2009 | Honda et al. | |
| 2009/0210254 | A1 * | 8/2009 | Gurney | 705/3 |
| 2009/0303522 | A1 | 12/2009 | Konsella | |

* cited by examiner

*Primary Examiner* — King Poon
*Assistant Examiner* — Andrew H Lam
(74) *Attorney, Agent, or Firm* — Blakely, Sokoloff, Taylor & Zafman LLP

(57) ABSTRACT

A method for labeling laboratory media may include generating, at a printer, a request to label a laboratory media. The laboratory media including a media cassette or a media slide that is used to hold one or more laboratory samples. The method may further include directing, in response to the request, a laser to label the laboratory media by generating an image on a portion of a surface of the laboratory media. The directing may be based on information retrieved from the request.

12 Claims, 6 Drawing Sheets

MECHANISM FOR LABELING LABORATORY PRINT MEDIA

RELATED APPLICATIONS

The present application is related to co-filed U.S. patent application Ser. No. 13/092,728 entitled "Mechanism for Coating Laboratory Media with Photo-Sensitive Material" and U.S. patent application Ser. No. 13/092,749 entitled "Mechanism for Remotely Facilitating Authorization and Activation of Laboratory Print Media Labeling", which are assigned to the assignee of the present application.

TECHNICAL FIELD

The embodiments of the invention relate generally to printing devices and, more specifically, relate to providing a mechanism for labeling laboratory print media.

BACKGROUND

Good Laboratory Practices (GLP) standards dictate that medical or laboratory samples (e.g., histologic specimen, such as microscopic anatomy of cells and tissues of plants, animals, and humans) are to be identified and their medical containers (herein referred to as "print media", "media", "media containers", or "media supplies") (e.g., slides, cassettes, test tubes, flasks, etc.) be labeled as soon as a sample enters a medical laboratory in order to identify and track the sample and to reduce any potential errors caused by improper identification of the sample. To address these concerns, special laboratory printers (or simply referred to as "printers") were developed. Laboratory printers are commonly used to print laboratory print media with certain identifying information. Typically, once a print media has been printed with a label, the sample contained on or within the media can be tracked throughout the process within the laboratory. However, due to various laboratory printer-related problems (such as high cost of the printer, and other technology- and non-technology-related limitations), many laboratories are forced to employ hand- or manual-labeling of the media.

To further enhance laboratory efficiency, software applications and systems (e.g., Laboratory Information System (LIS), Laboratory Integration Management Solution or Laboratory Information Management System (LIMS), etc.) were developed to be used to reliably identify and track samples as they are introduced into laboratories. LIS refers to a software system that can be used to receive, process, and store information generated by laboratory processes. LIMS refers to a software or database system that is used to integrate laboratory software and instruments, manage laboratory samples, standards, users, etc., in guiding laboratory samples through laboratories based on a set of defined processes or workflows for quality control in testing these samples. Since LIMS can facilitate simultaneous tracking of thousands of samples, there remains the need for accurate identification of each sample and the media that holds it.

For example, problems arise when it is desired that a sample be processed entirely through the LIMS and that the media containing the sample has a machine-readable label so that the sample's diagnosis time in the laboratory can be improved and reliably tracked. Certain conventional laboratory printers are capable of adding machine-readable labels to media. Although the use of machine-readable labeling may provide some improvement in sample diagnosis time, it can also introduce a new set of problems for laboratories and may not even be capable of being performed in certain laboratories due to, for example, the high cost of adding machine-readable identifiers and/or the laboratory's inherent limitations (e.g., space limitation). For example, the use of machine-readable labeling may not be employed in most laboratories as the laboratories are being squeezed by reduced budgets and reimbursements and consequently are having to reduce their physical space (that could have been used to hold large printing equipment) in order to allow for more patient capacity. In addition to not having sufficient space for large printers, these laboratories are also becoming averse to high capital costs relating to the existing printer technologies and are looking for ways to reduce costs and be able to pass their operating expenses on to their patients to help improve their bottom line. Further, laboratories are also being driven to reduce their "green" footprint by reducing consumables and the power requirements.

There are additional problems associated with the aforementioned conventional laboratory printers. For example, while printer capital acquisition costs are extremely high, these printers also require dedicated computers (e.g., personal computers (PCs)) as printer operators or operating computers to print media labels). Because the conventional printers are not designed like general computing printers and still employ old connectivity technologies, these printers require a computer be dedicated as an operator or operating computer for the sole purpose of printing on a particular type of media. One example of the old connectivity technologies is the 9-Pin Serial interface which has become obsolete on general computing platforms, but it is still being used with these conventional laboratory printers and is, at least partially, responsible for extremely slow printing outputs. Further, as aforementioned, these conventional printers are limited to printing only a single type of media (e.g., a cassette or a slide, but not both). This limitation further complicates the laboratory space limitation situation as it requires laboratories to have multiple printers along with multiple corresponding dedicated operating computers for printing on multiple media types, such as requiring one printer and its corresponding operating computer for printing on cassettes and another printer and its corresponding operating computer for printing on slides. As the deprecated operating systems and components of the host computers age, the costs of the systems continually escalate.

Current laboratory printing technologies for conventional laboratory printers include ink-jet and ribbon printers. One problem with the laboratory ink-jet printers is that they require using a special ink that is ultraviolet (UV) sensitive that can be cured so that any chemicals used in the sample diagnosis process do not accidently remove the printed label from the media. However, each time a UV light bulb (that is required to cure the special ink) goes out (typically, without a warning), it carries the potential to contaminate hundreds of samples and render them unable to be tracked in the LIMS, by way of the uncured UV sensitive ink. Ribbon printers require that a user correctly and cautiously load a ribbon into a ribbon printer without damaging or wasting too much of the ribbon. Further, instead of pre-loading laboratory media into ribbon printers for automatic printing, a user is required to load the media and continue watching the printer ribbon to be sure that the ribbon does not run to the end and stop all media printing processes.

Conventional printers are high in cost, restricted in their ability to print media (such as limited to printing only one particular type of media), limited in their ways of tracking and identifying samples, wasteful in terms of power and physical footprint and in requiring a dedicated operating computer, employ obsolete connectivity technologies, are error-prone, etc.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

SUMMARY

Figure 1:
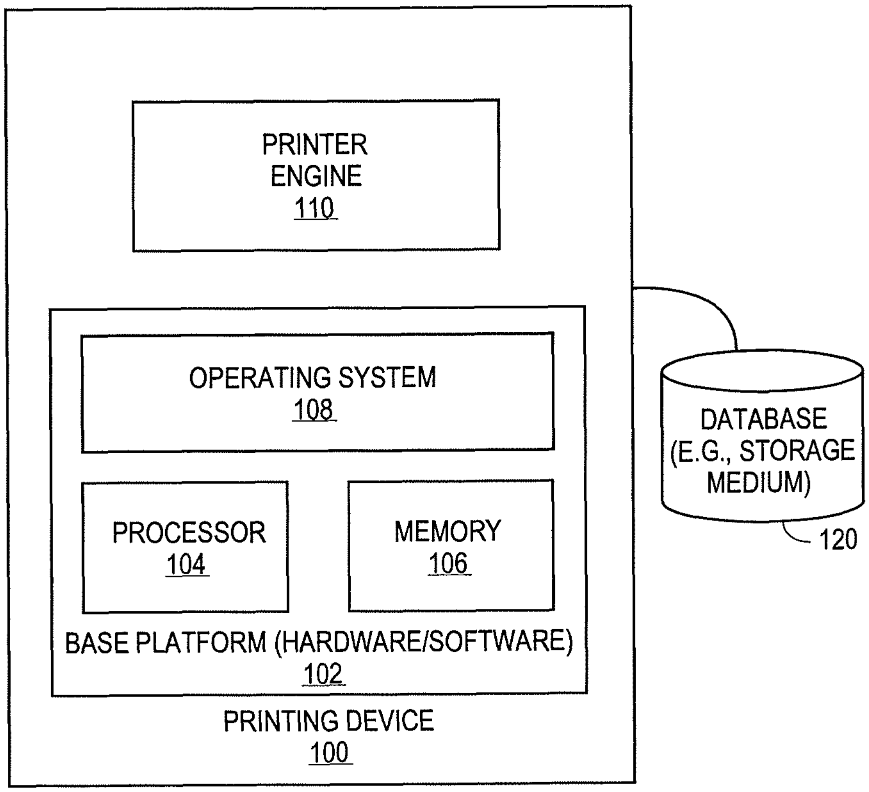
FIG. 1 illustrates a printing device employing a printer engine for labeling laboratory print media according to one embodiment of the invention.

Embodiments of the invention that provide a mechanism for labeling laboratory print media are described. In accordance with the embodiments, there are provided methods, apparatus, and systems for laser-based labeling of laboratory print media, such as a method of embodiments of the invention may include generating, at a printer, a request to label a laboratory media. The laboratory media includes a media cassette or a media slide that is used to hold one or more laboratory samples. The method may further include directing, in response to the request, a laser to label the laboratory media by generating an image on a portion of a surface of the laboratory media. The direction may be based on information retrieved from the request.

DETAILED DESCRIPTION

Embodiments of the invention that provide a mechanism for labeling laboratory print media are described. A method of embodiments of the invention may include generating, at a printer, a request to label a laboratory media. The laboratory media includes a media cassette or a media slide that is used to hold one or more laboratory samples. The method may further include directing, in response to the request, a laser to label the laboratory media by generating an image on a portion of a surface of the laboratory media. The direction may be based on information retrieved from the request.

The embodiments of the present invention are provided for identifying samples (e.g., histologic specimen, such as microscopic anatomy of cells and tissues of plants, animals, and humans) and their media (e.g., laboratory print media containers, such as cassettes, slides, etc.) within a laboratory environment by providing a mechanism for printing labels on multiple types of media (as opposed to printing a single media type that is a common limitation of the conventional media-printing techniques). In one embodiment, the mechanism provides laser-based media labeling (or printing or imaging) that is free of ink, ribbons, and various other conventional laboratory and printer consumables. Further, the embodiments of the present invention provide for media labeling that is faster, more efficient, Eco-Green, and more technologically-mature than the conventional media labeling.

In one embodiment, an integrated system having a printer or printing device having a printer engine is provided for labeling laboratory media at the time the samples contained within them are used or introduced to a laboratory. This labeling of the media includes producing an image on the media such that the image includes the relevant human- and machine-readable image having information (e.g., media- or sample-information, etc.) that can be used to identify and track various samples contained within the media during the samples' processing within the laboratory environment. In one embodiment, the image may be produced by inducing a visible color change on the media using a laser on the laser-sensitive material on the dedicated surface (e.g., a portion of the print media dedicated to imaging) of the media. For example, and in one embodiment, the printer engine provides and manages a laser light source, such as a laser, to generate a laser light beam, a moving reflective device (e.g., mirror), and a fixed media surface coated with light-sensitive material. The light beam may be adapted to activate the light-sensitive labeling layer on the media to produce visible change on the media surface from translucent to opaque to form an image on the print media.

For example, a method, apparatus or system may be provided to include a laboratory print media (e.g., medical slide, histology cassette, etc.) labeling mechanism to move a print media coated with a special laser- or light- or photo- or thermal-sensitive material, sealed from external chemical reactions using a chemical-resistance material coating to print a label or image on the print media at a pre-determined print location of a printer using a light source (e.g., laser) of the printer to temporarily or permanently imprint or display the image or data by activating the laser-sensitive material on the print media. The mechanism may further include moving the print media from the pre-determined print location to the eject location of the printer for human or robotic retrieval. The printer may include a laser focused on the angle of the print media such that the printing remains directly focused to the coating or the dedicated label surface of the print media. Further, the printed data or image or label is entirely encapsulated within the laser-sensitive material and sealed onto the dedicated label surface of the print media so that the image is proof against removal or damage during subsequent handling or treatment of the laboratory media. The print media is then transported onto an eject location of the printing device or apparatus. Further, the printing medium contains a laser-sensitive ink that is sealed in an immiscible coating agent.

FIG. 1 illustrates a printing device 100 employing a printer engine 110 for printing laboratory print media according to one embodiment of the invention. Printing device 100 serves as a host printing device that includes a base computing/printing platform 102 employing hardware and/or software. Throughout the document, terms like "printer" and "printing device" are used synonymously and interchangeably. Base platform 102 includes an operating system 108 serving as an interface between any hardware or physical resources of the printer 100 and a user (e.g., an end-user, such as a laboratory technician or assistant, using the printer 100 to label laboratory media). In some embodiments, the base platform 102 may further include a processor 104, memory devices 106, network devices, printer and other drivers, or the like. Memory devices 106 and/or database 120 (e.g., a remote or local storage medium) may be used to store printing system software, printer-specific data files, media-specific data files, etc. It is contemplated that the printer 100 may include various computing features or be part of a computing machine. Terms like "machine", "device", "computer" and "computing system" are used interchangeably and synonymously throughout this document.

In one embodiment, the printer 100 employs a printer engine 110 that represents a print mechanism for labeling laboratory media (e.g., cassettes, slides, test tubes, flasks, etc.) that serve as containers for laboratory samples (e.g., histology specimen). In one embodiment, the printer engine 110 is not limited to labeling a single media type nor does it require a dedicated computer to serve as a printer operator to facilitate labeling of laboratory media. Printer engine 110 provides a media labeling mechanism that is faster (e.g., prints through parallelization of the printing process), technologically-advanced (e.g., employs laser-based labeling (which is without the use of ink or ribbon) and modern communication and connection capabilities, etc.), more efficient (e.g., low power use, small physical footprint, laser-based printing that stays intact and can be easily tracked throughout laboratory sample processing), relatively inexpensive to purchase, maintain and operate compared to the conventional laboratory printers, and the like. With regard to the embodiments of the present invention, terms like “labeling”, “imaging”, and “printing” are used interchangeably and synonymously throughout the documents and refer to the laser-based printing (e.g., imaging or lasing) of a label (also referred to as an “image”) on the surface (e.g., on a dedicated portion of the surface) of the laboratory media, such as a cassette or a slide, that is capable of holding laboratory samples. Similarly, terms like “label”, “print”, and “image” are also synonymously and interchangeably used as are the terms “light”, “thermal”, and “photo”.

In one embodiment, the printer engine 110 includes various labeling components and entities to facilitate laser-based media labeling, such as producing laser-based images on the surface of any type of print media such that a laser beam is sufficiently articulated across the entire surface of the media to form an image to be printed on a particular portion of the media surface that is dedicated to have a label. A user (e.g., an end-user, such as a lab assistant or technician, etc.) may, in one embodiment, access the printer 100 directly (e.g., using a touch screen display of the printer 100 without the use of a dedicated computer operator) or, in another embodiment, through a computing device in communication with the printer 100. Printer engine 110 may be facilitated to orchestrate the communication of information from remote computing devices and/or the database 120 for directing the loading of the media, forming of the image on the media, ejecting of the media, and communicating resulting information back to the user (via a display coupled to the printer 100 or a remote computing device) once the printing has concluded. In one embodiment, since the media labeling or printing is laser-based, the image produced by the laser on the media surface is chemically and physically protected against removal or damage during subsequent handling of the media during sample processing with the laboratory environment.

Figure 2:
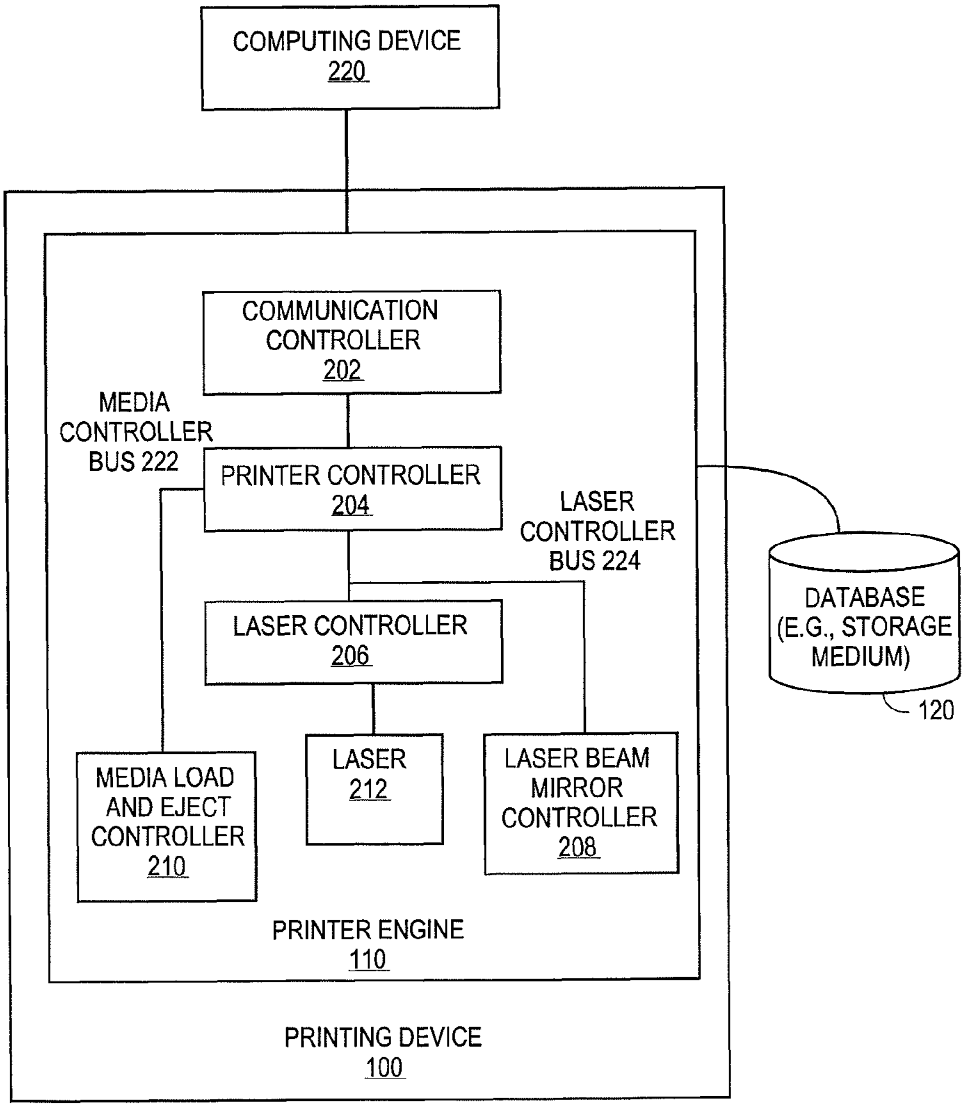
FIG. 2 illustrates a printer engine for labeling laboratory print media according to one embodiment of the invention.

FIG. 2 illustrates a printer engine 110 for labeling laboratory print media according to one embodiment of the invention. In one embodiment, printer engine 110 represents a print mechanism for identifying laboratory samples (e.g., histology specimen, etc.) and their media containers by providing laser-based labeling of various types of laboratory print media (e.g., cassettes, slides, etc.) that serve as the media containers for the samples. In one embodiment, printer engine 110 includes a communication controller 202, a printer controller 204, a laser controller 206, a laser beam mirror controller 208, a media load and eject controller 210, and a laser 212. It is contemplated that the printer engine 110 may include or be in communication with other computing and printing components, such as processors, memory devices, display devices, drivers, graphics cards, and the like, to facilitate computing and printing functions and provide the desired capability and connectivity within a laboratory environment and as described with reference to FIG. 1.

In one embodiment, the media load and eject controller 210 is used to control and manage loading and ejecting of media from the printer 100. For example, a dedicated print staging area (e.g., a tube, a flatbed, a hopper, a slot, etc.) may be provided within the printer 100 where one or more laboratory media may be loaded, held, and ejected with the use of the media load and eject controller 210. Laser controller 206 includes a laser beaming and positioning mechanism to control how the laser is pulsed to produce an image on the media, and how the laser beam is articulated across the surface of the media to form the image to be printed on the media. Laser controller 206 is further used to control and manage the pulsing of the laser beam and the time required for the laser to be shining on the media to create the image on the media surface. Printer controller 204 acts to orchestrate the communication of information received from an external computing device 220 or extracted from a database 120 to direct loading of the media, printing of the image on the media, ejecting the media, and then communicating back the resulting information to the computing device 220 once the printing process is completed.

In one embodiment, a user (e.g., an end-user, such as a laboratory technician) may choose to interact directly with the printer 100 (e.g., using a touch panel of the printer 100) or through a remote computing device 220 to label the media at the printer 100. For example, the user may choose a direct interaction with the printer 100 by selecting, for example, a print media option (e.g., label cassette, label slide, etc.) on the touch panel of the printer 100. The user may also access the printer 100 using the remote computing device 220, such as the user may request media labeling through a printing software application (e.g., a media labeling software application, an LIS-based software application, etc.) employed on the computing device 220 that is in communication with the printer 100. Further, in one embodiment, given the printer engine 110 is capable of facilitating labeling of multiple types of media, the user may be given an option to select one or more types of media (e.g., a cassette or a slide, etc.) either directly through the touch panel of the printer 100 or the printing software application employed at the computing device 220.

The user's request to print or label a media is then received at and processed by the printer engine 110. In processing the request, the printer controller 204 receives, via the communication controller 202, the user request either from the computing device 220 or the front panel of the printer 100. The printer controller 204 forwards, via a media controller bus 222, the print request to the media load and eject controller 210. Using the image/media information contained within the request, the media load and eject controller 210 loads the relevant media (e.g., cassette or slide) into the printer's print staging area that is, as aforementioned, a dedicated area (e.g., slot, tube, hopper, flatbed, etc.) of the printer that is used to load, hold, and eject a media. For example, depending on the user's choice of media, one or more cassettes or slides may be loaded into the print staging area by the user or other means, such as a robot. Further, an already-loaded media that is being held in the print staging area may be selected for processing as triggered by the media load and eject controller 210 upon receiving the print request. The image and/or media (“image/media”) information may be provided by the user, retrieved from the database 120, and/or obtained from the computing device 220, or the like. The image/media information may include any range of data about the media (e.g., the type of media, etc.) that is being labeled and the image (e.g., project name, sample identification, sample type, etc.) that is being printed on the media as well as relevant information about the user (e.g., user name, user title, etc.) and the laboratory (e.g., laboratory name, location, etc.) that are involved in the processing of samples, and the like.

In one embodiment, the printer controller 204 then sends the image/media information of the request to the laser controller 206 which then instructs a laser 212 about when to turn on and off as the laser 212 is moved across the media surface by reflecting off of a laser beam mirror being controlled by the laser beam mirror controller 208. Laser controller 206 may communicate the instructions to the laser via the laser beam mirror controller 208 and further via a laser controller bus 224. Simultaneously, the printer controller 204 sends image/media information of the print request to instruct the laser beam mirror controller 208 regarding where or which way to move as the laser 212 is pulsed via the laser controller 206 so that an image may be printed or lased onto the dedicated portion of the media surface.

Once the laser beam has been moved and pulsed on and off by the laser 212 across the entire surface of the media, the image is determined to be created. Once the image has been created, the printer controller 204 instructs the laser controller 206 to turn off the laser 212. Simultaneously, the printer controller 204 may instruct the laser beam mirror controller 208 to return to its default or home position so that the laser 212 can be reset for the next media that is chosen for labeling and loaded into the print staging area. The printer controller 204 then instructs the media load and eject controller 210 to eject the current, already processed, media from the print staging area of the printer 100.

In one embodiment, a laser beam emitted from the laser 212 may be positioned on the surface of the media using a laser beam positioner that is controlled by the laser beam mirror controller 208 and may be presented, for example, in the form of a micro-electro-mechanical systems (MEMS) mirror. In another embodiment, galvanic actuated mirrors or rotating polygon mirrors may be used to perform the desired functionality. Further, the laser controller 206 may include an array of functionalities of the laser beam or the laser beam mirror positioner which may be controlled by software to emulate the functionality of printing the image on the media.

Furthermore, in one embodiment, various printing instructions may be loaded into the printer controller 204 from a suitable printer communications device connected to an external data source, such as the database 120, via an external communication device interface provided by the communication controller 202. The on-board printer controller 204 controls how these external communications devices, including the remote computer device 220 and the database 120, are accessed via external communication device interfaces provided by the communication controller 202 to pass data from these external sources to the printer controller 204 to control the laser controller 206 and the aforementioned media printing tasks.

Figure 3A:
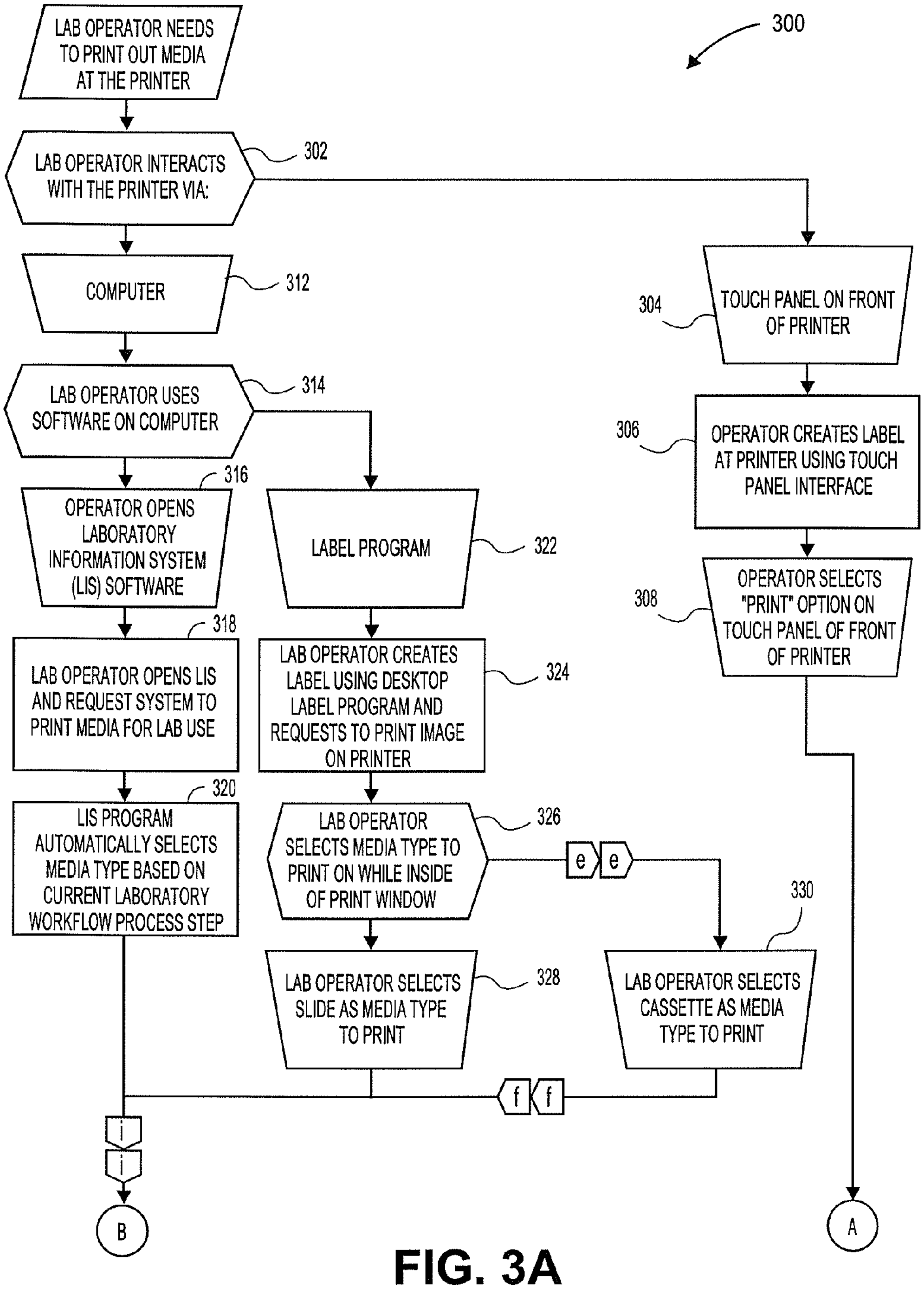
FIGS. 3 thru 3C illustrate a method for labeling laboratory print media according to one embodiment of the invention.
Figure 3B:
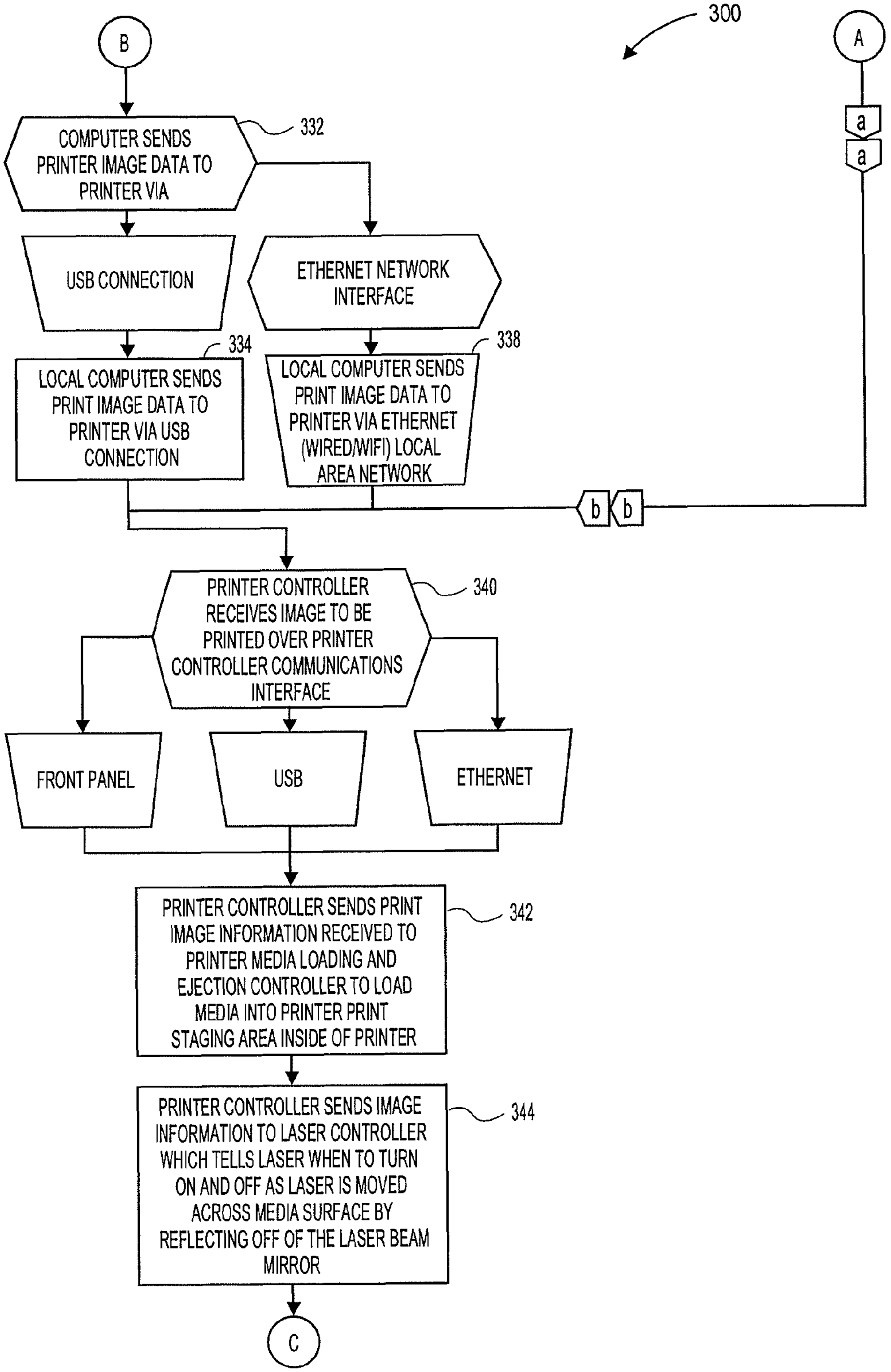
Figure 3C:
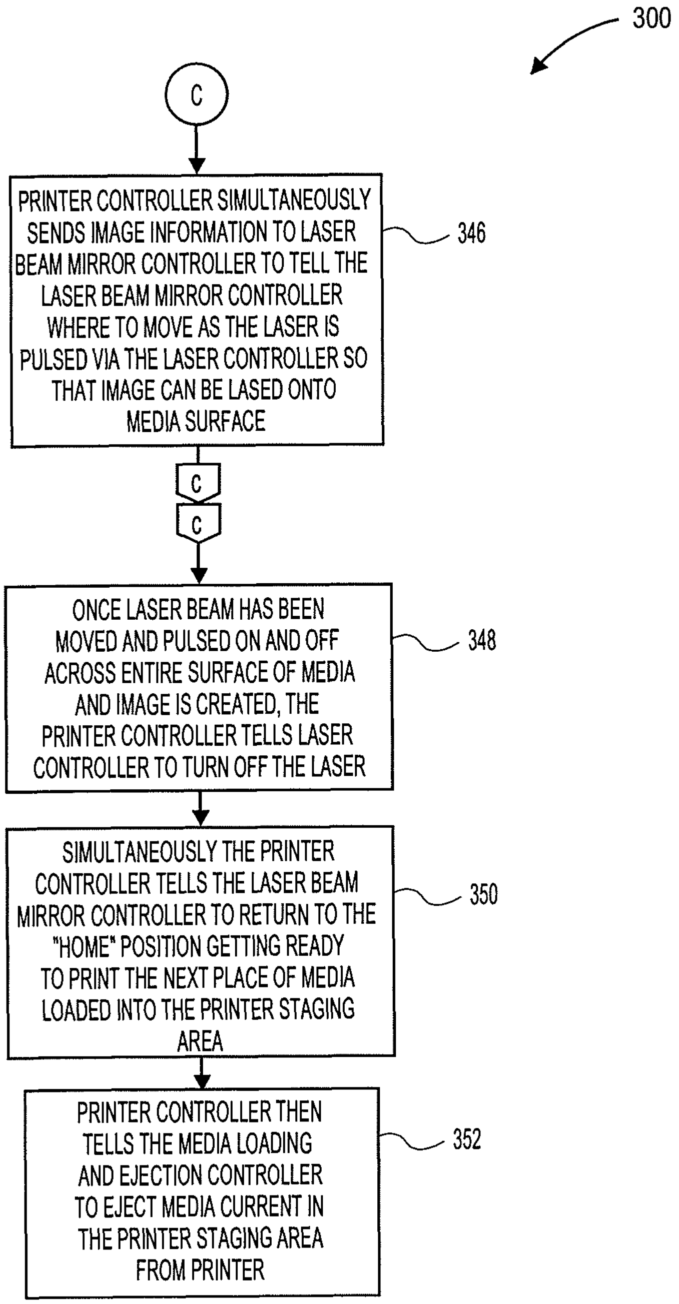

FIGS. 3A thru 3C illustrate a method 300 for printing laboratory print media according to one embodiment of the invention. Method 300 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 300 is performed by a print mechanism illustrated as the printer engine of FIG. 1.

Referring to FIG. 3A, method 300 begins at block 302 with a user (e.g., laboratory operator) interacting with a printer to request printing of a laboratory print media (e.g., a cassette, a slide, etc.). In one embodiment, the user chooses to directly interact with the printer by using the printer's touch panel which may be located, for example, on the front of the printer at block 304. Using the touch panel of the printer, the user generates a label it wants printed on the media and submits it as user request at block 306. The touch panel and its displayed options and functions may be powered by the printer engine of FIGS. 1 and 2. In addition to the label, certain other image/media information, as described with reference to FIG. 2, may be included in the user's request. For example, the user request may include information about the user's choice of the type of media (e.g., cassette or slide) that is to be printed. In one embodiment, the user selects an option (e.g., print option, media type option, etc.) on the touch panel to elect the type of media that is to be printed at block 308.

Referring back to block 302, in one embodiment, the user chooses a remote or external computing device to interact with the printer at block 312. When choosing the remote computing device, the user may use a printing software application employed on the computing device to facilitate the print request to print the media, at block 314, such as LIS software 316. The user may access the LIS software to request the computer system to facilitate the printer to print the media at block 318. When using the LIS software, the user may not have to select the media type since the LIS software can automatically select the media type (e.g., cassette or slide) based on the current laboratory process workflow (e.g., depending on the process workflow step that is in progress, the LIS software can automatically determine whether a cassette or a slide be labeled) at block 320.

In another embodiment, the printing software application may include a label software program, at block 322. For example, the user may access the label software program's desktop label program to create a label to be imaged on the media and request that the printer be facilitated to print the label on the media at block 324. In this case, at block 326, the user may then select the type of the media on which the label is to be printed, such as a slide, at block 328, or a cassette, at block 330. Continuing with FIG. 3B, at block 332, the remote computing device sends the print request having the image/media information to the printer via a particular connection, such as a Universal Serial Bus (USB) connection at block 334 or an Ethernet network interface at block 338. It is contemplated that the external or remote software programs mentioned here, such as the LIS software or the label program, etc., as well as the connections, such as the USB and Ethernet connections, etc., are merely used here as examples for brevity and simplicity and that the embodiments of the present invention are not limited to these programs, connection types, or the like.

At block 340, the printer controller of the printer engine of the printer receives the print request along with its image/media information via the printer engine's communication controller. The image/media information may be received through the touch panel of the printer or via USB connection or Ethernet interface when received from the computing device. At block 342, the printer controller sends the image/media information to a printer media load and eject controller to load media into a printer staging area of the printer to initiate processing of the labeling of the media. As aforementioned, the type of media, such as cassette or slide, may be determined by the user or the LIS software based on the ongoing laboratory process workflow. At block 344, the printer controller then forwards the image/media information to a laser controller of the printer to guide a laser as to when to turn on and off and where and when to move as the laser moves across the surface of the media by reflecting off of the laser beam mirror.

Referring now to FIG. 3C, at block 346, the printer controller simultaneously sends the image/media information to a laser beam mirror controller to direct it to move as the laser is pulsed via the laser controller so that the image may be "lased" or printed onto the media surface. At block 348, once the laser beam has been moved and pulsed on and off across the entire surface of the media and the image on a dedicated portion of the surface of the media is created, the printer controller informs the laser controller to turn off the laser. Simultaneously, the printer controller directs the laser beam mirror controller to return to its default or home position to get ready to print the next piece of media that is selected and/or loaded into the print staging area at block 350. At block 352, the printer controller then informs the media load and eject controller to eject the processed media from the print staging area of the printer. The entire process may be repeated with another print request to print the next media.

Figure 4:
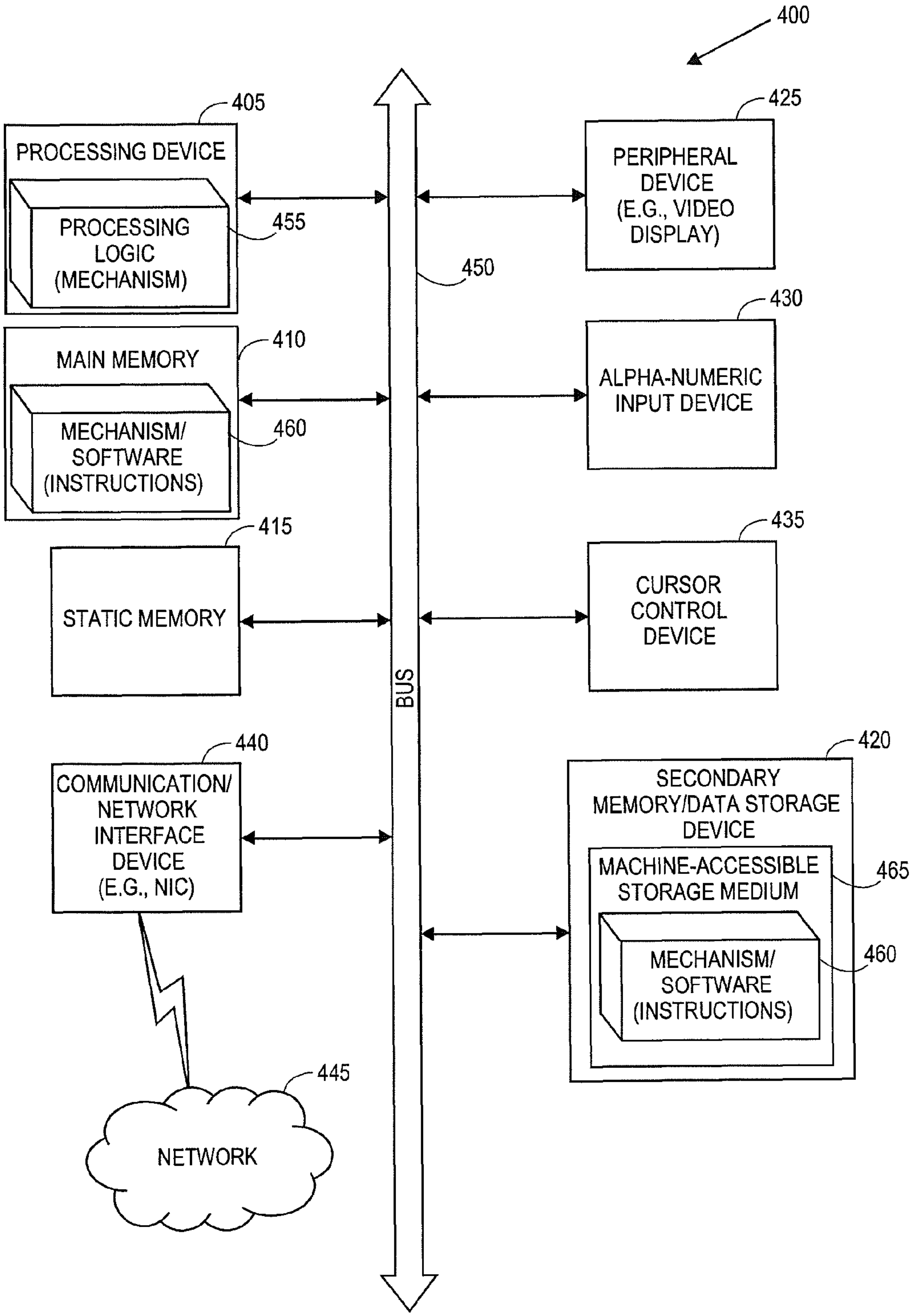
FIG. 4 illustrates a computer system according to one embodiment of the invention.

FIG. 4 illustrates a computer system for employing a printing mechanism having a printing device employing a printer engine of FIG. 1 according to one embodiment of the invention. Computer system 400 represents or includes a basic circuitry to support a printer, such as FIG. 1's printing device employing a printer engine 110, to perform various printing tasks of laboratory media in a laboratory environment. In one embodiment, computer system 400 provides the basic circuitry that is employed within the printer to represent the printer as a printing device or, in another embodiment, the computer system 400 may represent an outside-the-printer (local or remote) basic circuitry that is in communication with and facilitates the printer to perform its printing tasks. Computer system 400 may include and function in a server or client computer system capacity in, for example, a server-client environment. Computer system 400 may be printer 100 of FIG. 1, a personal computer (PC), a Personal Digital Assistant (PDA), a computer pad or tablet, a smart mobile phone, a web server, or any data processing machine capable of storing and executing instructions to perform various tasks (including the ones performed by printer engine 110 of FIG. 1) mentioned throughout this document.

Although the computer system 400 shown as a single machine, it is contemplated that the term "machine", as referred to in this document, may include any number of machines in communication with each other or other remote machines. Computer system 400 may be in communication with other machines over a network (e.g., local area network (LAN), wide area network (WAN), metropolitan area network (MAN), intranet, the Internet, etc.) as connected or networked through a communication/network interface device 440 (e.g., network interface card (NIC), USB connection, modem, other devices such as to connect to Ethernet, token ring, etc.). Further, computer system 400 may be accessed by, or communicated with, using various other input/output (I/O) devices, such as an input device, such as an alpha-numeric input device 430 (e.g., keyboard) and/or a cursor control device 435 (e.g., mouse), and a peripheral display device 425 (e.g., a video display device, such as a liquid crystal display (LCD), a cathode ray tube (CRT), etc.) and other similar devices, such as speakers, microphones, etc., connected through a graphics port, chipset, or another human or machine interface device.

Computer system 400 includes a processing device 405. Processing device 405 represents one or more general-purpose processing devices (such as a microprocessor, central processing unit, etc.) and more particularly, the processing device may be complex instruction set computing (CISC) microprocessor, reduced instruction set computer (RISC) microprocessor, very long instruction word (VLIW) microprocessor, or a processing device implementing other instruction sets or a combination of instruction sets. Processing device 405 may also be one or more special-purpose processing devices (e.g., an application specific integrated circuit (ASIC), a field programmable gate array (FPGA), a digital signal processor (DSP), a microprocessor, a network processor, etc.). In one embodiment, processing device 405 is configured to execute the processing logic 455 (e.g., printer engine processing logic) for performing the operations and methods discussed herein and as performed by the printer engine of FIG. 1.

Computer system 400 further includes a main memory 410 (e.g., read-only memory (ROM), flash memory, random access memory (RAM), dynamic RAM (DRAM), synchronous DRAM (SDRAM), etc.), a static memory 415 (e.g., flash memory, static random access memory (SRAM), etc.), and other storage devices 420 (e.g., a data storage device or a magnetic disk or optical disc in the form of a drive unit, which may include fixed or removable machine-accessible or computer-readable storage medium), which communicate with each other via a bus 450. Storage 420 may include a non-transitory machine-accessible storage medium 465 that may then be used to store one or more sets of instructions 460 (e.g., printer engine instructions). These instructions 460 may be transmitted or received over a network via the network interface device 440 coupled with a network 445 (e.g., Internet). The instructions 460 of the printer engine of FIG. 1 may also reside, completely or at least partially, within the main memory 410 and/or within the processing device 405 as processing logic 455 (e.g., printer engine processing logic) during execution thereof by the computer system 400, the main memory 410 and the processing device 405 also constituting a non-transitory machine-readable storage media. Further, in one embodiment, the printing mechanism, the printing device, or the printer engine of FIG. 1 may be employed (entirely) on a single machine, such as computer system 400, or (partially or entirely) on different computer systems.

While the non-transitory machine-accessible storage medium 465 is described as a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

As aforementioned, in one embodiment, the printer engine is represented as and includes modules, components and other features, as described throughout this document, can be implemented as discrete hardware components or integrated in the functionality of hardware components such as Application-Specific Integrated Circuit (ASIC), Field-Programmable Gate Array (FPGA), Digital Signal Processor (DSP), etc., or as software or as firmware or functional circuitry.

Throughout the foregoing description, for the purposes of explanation, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. An algorithm is here, and generally, conceived to be a self-consistent sequence of processes or steps leading to a desired result, and these processes or steps are those requiring physical manipulations of physical quantities manifesting as electrical or magnetic signals (e.g., bits, values, elements, symbols, characters, terms, numbers, etc.) capable of being stored, transferred, combined, compared, and otherwise manipulated. Further, terms (such as "accessing", "placing", "analyzing", "communicating", "processing", "compiling", "saving", "storing", "generating", "receiving", "forwarding", "printing", "labeling", "imaging", "directing", "instructing", "displaying", "detecting", etc.) may be associated with various physical quantities and refer to action or processes or steps of processing logic of a processing device, such as the processing device 405, of a data processing device, such as the computer system 400.

It is contemplated that apparatus may be specially constructed for the required purposes, or it may comprise a general purpose computer selectively activated or reconfigured by a computer program stored in the computer. Such a computer program may be stored in a non-transitory machine readable storage medium, such as, but not limited to, any type of disk including floppy disks, optical disks, magnetic-optical disks, ROMs, compact disk ROMs (CD-ROMs), RAMs, erasable programmable ROMs (EPROMs), electrically EPROMs (EEPROMs), magnetic or optical cards, or any type of media suitable for storing electronic instructions, each coupled to a computer system bus. However, it is further contemplated that methods (e.g., algorithms, processes, steps, etc.) and displays presented herein are not inherently related to any particular computer system or apparatus. Various general purpose systems may be used with programs in accordance with the teachings herein, or it may prove convenient to construct more specialized apparatus to perform the required method steps. Moreover, the present invention is not described with reference to any particular programming language or operating system or software platform. For example, it is appreciated that a variety of programming languages may be used to implement the teachings of the invention as described herein.

As aforementioned, embodiments of the present invention may be provided as a computer program product, or software, that may include a non-transitory machine-readable medium having stored thereon instructions, which may be used to program a computer system (or other electronic devices) to perform a process according to the present invention. A machine-readable medium includes any mechanism for storing or transmitting information in a form readable by a machine (e.g., computer system 400). For example, a non-transitory machine-readable 465 (e.g., a non-transitory computer-readable) medium includes a machine (e.g., a computer) readable storage medium (e.g., ROM, RAM, magnetic disk storage media, optical storage media, flash memory devices, etc.), a machine (e.g., computer) readable transmission medium (non-propagating electrical, optical, or acoustical signals), etc.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "X" is coupled to or with element "Y," element X may be directly coupled to element Y or be indirectly coupled through, for example, element "Z". When the specification or claims state that a component, feature, structure, process, or characteristic X "causes" a component, feature, structure, process, or characteristic Y, it means that "X" is at least a partial cause of "Y" but that there may also be at least one other component, feature, structure, process, or characteristic that assists in causing "Y." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements. Further, an embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments.

Any of the above embodiments may be used alone or together with one another in any combination. One or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

In the foregoing specification, the invention has been described with reference to specific exemplary embodiments thereof. It will, however, be evident that various modifications and changes may be made thereto without departing from the broader spirit and scope of the invention as set forth in the appended claims. The Specification and drawings are, accordingly, to be regarded in an illustrative rather than a restrictive sense.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method comprising:

receiving, at a printer, a request having image configuration data, wherein the request is placed by a user via a direction interaction using a touch panel of the printer or an indirect interaction using a software application at a computing device over a network;

generating, at the printer, instructions based on the image configuration data to facilitate producing a label on and within a dedicated area of a laboratory media container, wherein the dedicated area is coated with a sensitive material including a chemical-resistance material coating that is sealed from external chemical reactions, wherein the label is temporarily or permanently displayed by activating the sensitive material of the dedicated area, wherein the label is encapsulated within the sensitive material and sealed onto the dedicated area to proof the label from damage or removal, wherein the laboratory media container to hold one or more laboratory samples, wherein the laboratory media container is associated with one or more media types including glass media types having a media cassette, a media slide, a media vial, and a media test tube, wherein the printer comprises a dedicated stage area that is capable of holding the laboratory media container, wherein the laboratory media container is automatically loaded into or automatically ejected from the dedicated stage area, wherein the label includes an image such that the image is produced in accordance with the image configuration data compliance with print requirements associated with a media type associated with the laboratory media container, and wherein the laboratory media container and the associated media type are automatically selected based on a current processing phase of an ongoing laboratory workflow process as determined by a media labeling software application and further based on a user selection as provided in the image configuration data; and determining the print requirements relating to a media type of the laboratory media container, wherein the print requirements include one or more of surface types of the surface, angles, offsets, laser beam focal points, laser beam strengths, and head capabilities associated with each of the one or more media types, and wherein the image is printed in accordance with print requirements, and wherein directing comprises facilitating the laser to generate an image on the portion of the surface of the laboratory media container by pulsing on the portion of the surface while moving across the entire surface of the laboratory media container by reflecting off of a laser beam mirror, wherein the laser is facilitated using a laser beam controller such that the laser beam controller controls galvanic actuated mirrors or rotating polygon mirrors associated with the laser.

2. The computer-implemented method of claim 1, further comprising locating the portion of the surface of the laboratory media container based on the image configuration data, wherein the surface types of the surface comprises one or more of a two-dimensional surface type and a three-dimensional surface type and wherein the two-dimensional and three-dimensional surface types are supported by a single print head of the printer, wherein the portion of the surface is located to facilitate the print head having the laser to attain precise image positioning and image quality.

3. The computer-implemented method of claim 1, wherein the ongoing laboratory workflow process is used when the request is received, at the printer, from the software application at computing system coupled with the printer, wherein the software application includes a Laboratory Information System (LIS) software application or a media labelling software application.

4. The computer-implemented method of claim 1, wherein the dedicated storage area comprises one or more of a tube, a flatbed, a hopper, and a slot, wherein the computing device is coupled to the printer over the network including the Internet, wherein the computing is further coupled to the printer via one or more connections including a Universal Serial Bus (USB) connection or an Ethernet connection.

5. A system comprising: a printing device having a printer engine, the printer engine to: receive, at a printer, a request having image configuration data, wherein the request is placed by a user via a direction interaction using a touch panel of the printer or an indirect interaction using a software application at a computing device over a network;

generate, at the printer, instructions based on the image configuration data to facilitate producing a label on and within a dedicated area of a laboratory media container, wherein the dedicated area is coated with a sensitive material including a chemical-resistance material coating that is sealed from external chemical reactions, wherein the label is temporarily or permanently displayed by activating the sensitive material of the dedicated area, wherein the label is encapsulated within the sensitive material and sealed onto the dedicated area to proof the label from damage or removal, wherein the laboratory media to hold one or more laboratory samples, wherein the laboratory media is associated with one or more media types including glass media types having a media cassette, a media slide, a media vial, and a media test tube, wherein the printer comprises a dedicated stage area that is capable of holding the laboratory media container, wherein the one or more laboratory media container is automatically loaded into or automatically ejected from the dedicated stage area, wherein the label includes an image such that the image is produced in accordance with the image configuration data in compliance with print requirements associated with a media type associated with the laboratory media container, and wherein the laboratory media container and the associated media type are automatically selected based on a current processing phase of an ongoing laboratory workflow process as determined by a media labeling software application and further based on a user selection as provided in the image configuration data; and determine the print requirements relating to a media type of the laboratory media container, wherein the print requirements include one or more of surface types of the surface, angles, offsets, laser beam focal points, laser beam strengths, and head capabilities associated with each of the one or more media types, and wherein the image is printed in accordance with the print requirements, and wherein directing comprises facilitating the laser to generate an image on the portion of the surface of the laboratory media container by pulsing on the portion of the surface while moving across the entire surface of the laboratory media container by reflecting off of a laser beam mirror, wherein the laser is facilitated using a laser beam controller such that the laser beam controller controls galvanic actuated mirrors or rotating polygon mirrors associated with the laser.

6. The system of claim 5, wherein the printer engine is further to locate the portion of the surface of the laboratory media container based on the image configuration data, wherein the surface types of the surface comprises one or more of a two-dimensional surface type and a three-dimensional surface type and wherein the two-dimensional and three-dimensional surface types are supported by a single print head of the printer, wherein the portion of the surface is located to facilitate the print head having the laser to attain precise image positioning and image quality.

7. The system of claim 5, wherein the ongoing laboratory workflow process is used when the request is received, at the printer, from the software application employed at computing system coupled with the printer, wherein the software application includes a Laboratory Information System (LIS) software application or a media labelling software application.

8. The system of claim 5, wherein the dedicated storage area comprises one or more of a tube, a flatbed, a hopper, and a slot, wherein the computing device is coupled to the printer over the network including the Internet, wherein the computing is further coupled to the printer via one or more connections including a Universal Serial Bus (USB) connection or an Ethernet connection.

9. A non-transitory machine-readable medium including instructions that, when executed by a processing device, cause the processing device to:

receive, at a printer, a request having image configuration data, wherein the request is placed by a user via a direction interaction using a touch panel of the printer or an indirect interaction using a software application at a computing device over a network;

generate, at the printer, instructions based on the image configuration data facilitate producing a label on and within a dedicated area of a laboratory media container, wherein the dedicated area is coated with a sensitive material including a chemical-resistance material coating that is sealed from external chemical reactions, wherein the label is temporarily or permanently displayed by activating the sensitive material of the dedicated area, wherein the label is encapsulated within the sensitive material and sealed onto the dedicated area to proof the label from damage or removal, wherein the laboratory media to hold one or more laboratory samples, wherein the laboratory media is associated with one or more media types including glass media types having a media cassette, a media slide, a media vial, and a media test tube, wherein the printer comprises a dedicated stage area that is capable of holding the laboratory media container, wherein the one or more laboratory media container is automatically loaded into or automatically ejected from the dedicated stage area, wherein the label includes an image such that the image is produced in accordance with the image configuration data, in compliance with print requirements associated with a media type associated with the laboratory media container, and wherein the laboratory media container and the associated media type are automatically selected based on a current processing phase of an ongoing laboratory workflow process as determined by a media labeling software application and further based on a user selection as provided in the image configuration data; and determine the print requirements relating to a media type of the laboratory media container, wherein the print requirements include one or more of surface types of the surface, angles, offsets, laser beam focal points, laser beam strengths, and head capabilities associated with each of the one or more media types, and wherein the image is printed in accordance with the print requirements, and wherein directing comprises facilitating the laser to generate an image on the portion of the surface of the laboratory media container by pulsing on the portion of the surface while moving across the entire surface of the laboratory media container by reflecting off of a laser beam mirror, wherein the laser is facilitated using a laser beam controller such that the laser beam controller controls galvanic actuated mirrors or rotating polygon mirrors associated with the laser.

10. The non-transitory machine-readable medium of claim 9, wherein the processing device is further to locate the portion of the surface of the laboratory media container based on the image configuration data, wherein the surface types of the surface comprises one or more of a two-dimensional surface type and a three-dimensional surface type and wherein the two-dimensional and three-dimensional surface types are supported by a single print head of the printer, wherein the portion of the surface is located to facilitate the print head having the laser to attain precise image positioning and image quality.

11. The non-transitory machine-readable medium of claim 9, wherein the ongoing laboratory workflow process is used when the request is received, at the printer, from the software application employed at computing system coupled with the printer, wherein the software application includes a Laboratory Information System (LIS) software application or a media labelling software application.

12. The non-transitory machine-readable medium of claim 9, wherein the dedicated storage area comprises one or more of a tube, a flatbed, a hopper, and a slot, wherein the computing device is coupled to the printer over the network including the Internet, wherein the computing is further coupled to the printer via one or more connections including a Universal Serial Bus (USB) connection or an Ethernet connection.

* * * * *